M. SITNEY.
CLUTCH MECHANISM.
APPLICATION FILED NOV. 5, 1917.

1,394,448.

Patented Oct. 18, 1921.

Massey Sitney
INVENTOR

BY Marshall & Dearborn
ATTORNEYS

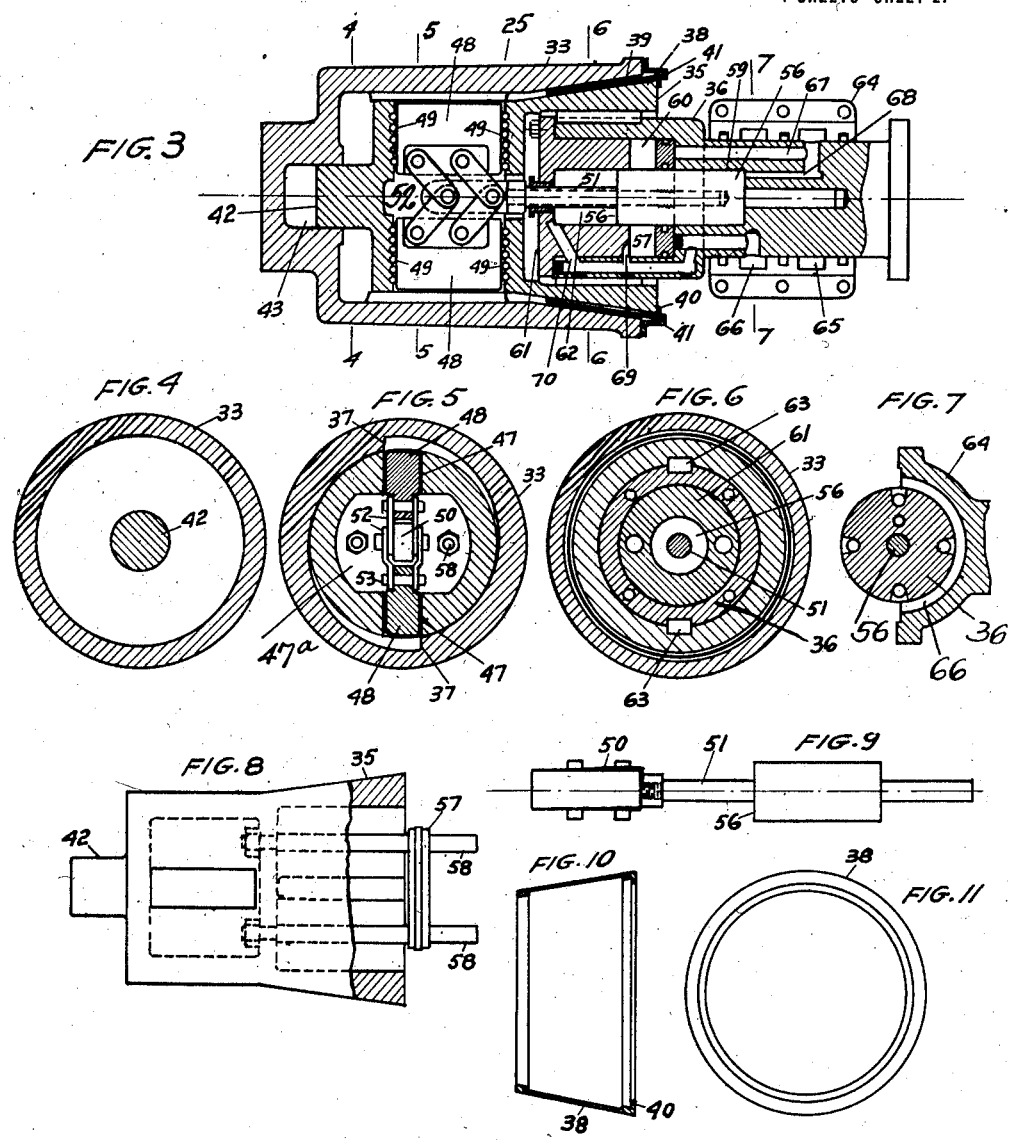

M. SITNEY.
CLUTCH MECHANISM.
APPLICATION FILED NOV. 5, 1917.
1,394,448.
Patented Oct. 18, 1921.
4 SHEETS—SHEET 3.
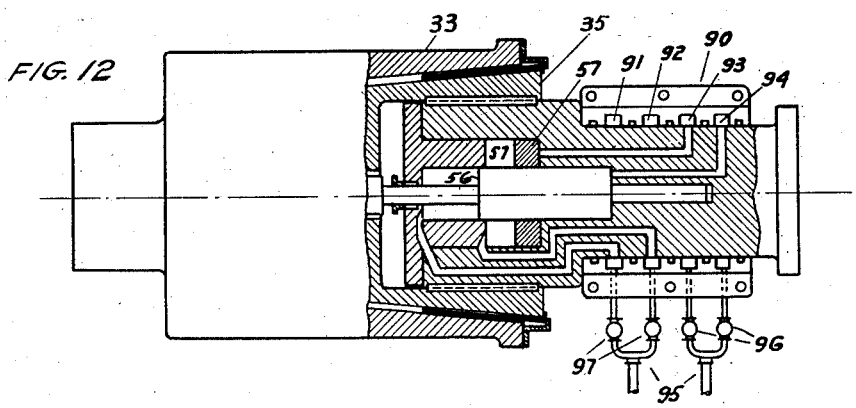
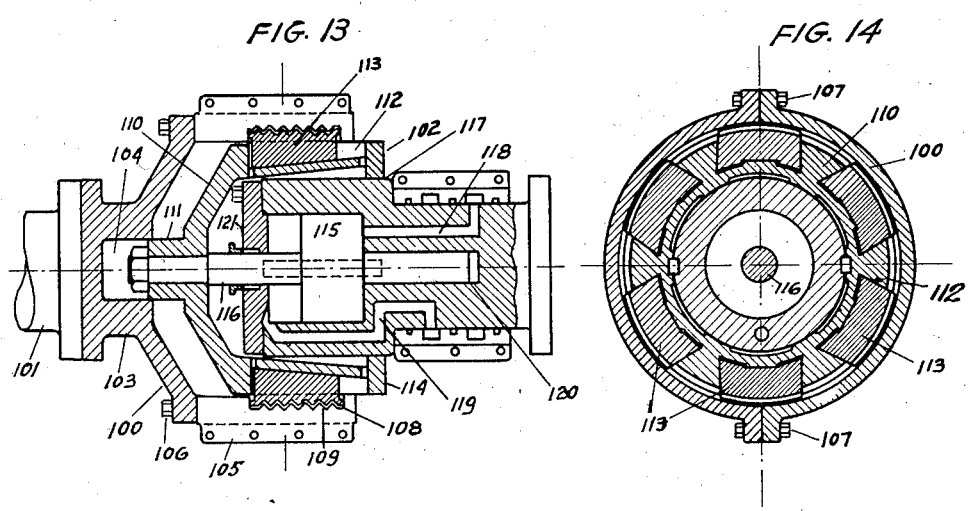
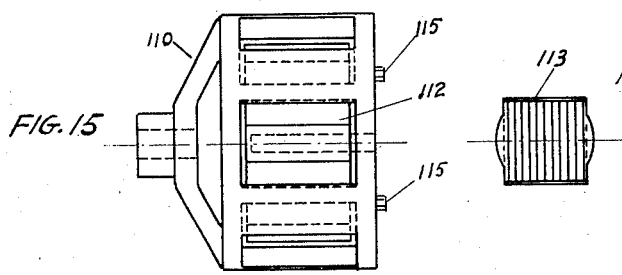
INVENTOR
Massey Sitney
BY
Marshall + Dearborn
ATTORNEYS

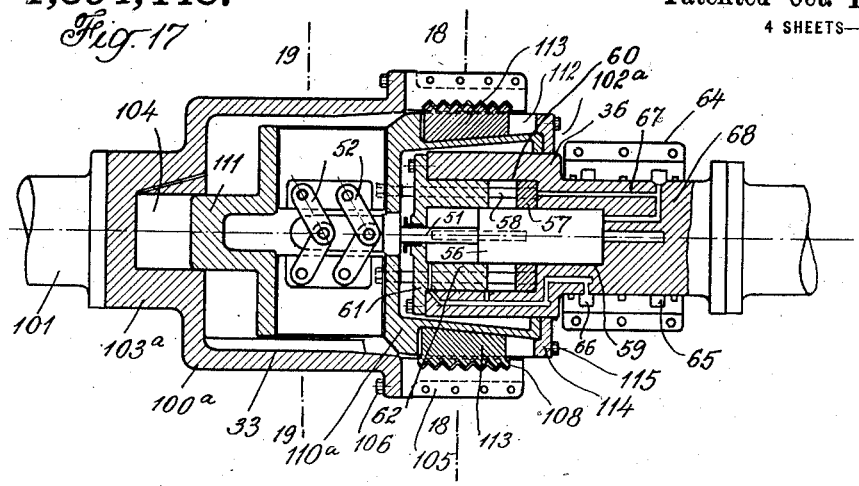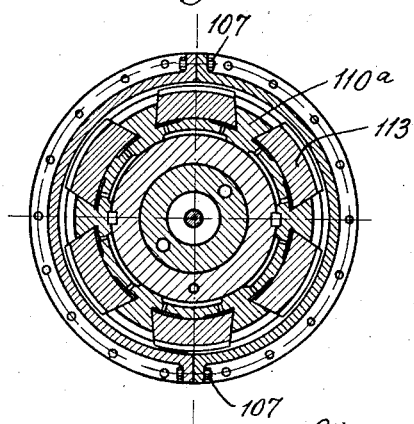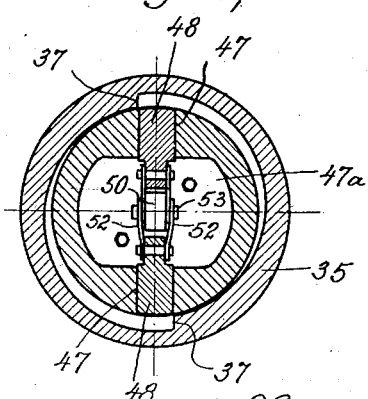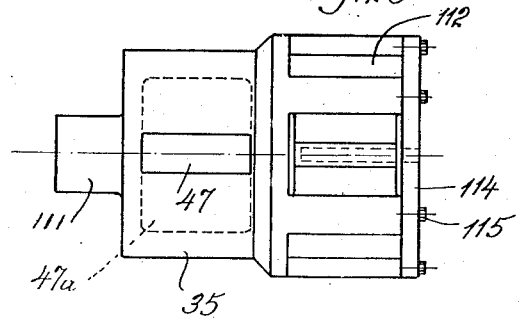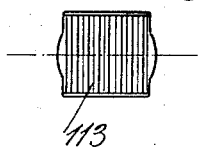

UNITED STATES PATENT OFFICE.

MASSEY SITNEY, OF BROOKLYN, NEW YORK.

CLUTCH MECHANISM.

1,394,448. Specification of Letters Patent. Patented Oct. 18, 1921.

Application filed November 5, 1917. Serial No. 200,260.

*To all whom it may concern:*

Be it known that I, MASSEY SITNEY, a citizen of the United States of America, and a resident of Brooklyn, Kings county, and State of New York, have invented certain new and useful Improvements in Clutch Mechanism, of which the following is a specification, reference being had to the accompanying drawings, forming a part thereof.

My invention relates to mechanisms for the transmission of power by mechanical means and has special reference to such as embody selective clutches for determining the direction in which the driven member of the mechanism is operated.

In Patent No. 1,248,735 issued to me on the 4th day of December, 1917, of which this application is a continuation in part, I have shown and described reversing mechanism embodying clutches which form the subject matter of my present invention.

One object of my invention is to provide a simple and effective clutch adapted to form a part of a reversing mechanism suitable for the transmission of large power at high speed and which may, for example, be employed between the driving shaft of an engine, such as a steam turbine arranged to operate continuously in one direction of rotation, and a driven apparatus such as a marine propeller, rolling mill or other device which must be capable of operating in either direction of rotation.

Another object of my invention is to provide a clutch that shall comprise means for operating either as a friction clutch or as a jaw clutch, or by the combined action of both mechanisms as desired.

In order that my invention may be thoroughly understood I will now proceed to describe the same in the following specification, and then point out the novel features thereof in appended claims.

Referring to the drawings:

Fig. 3 is a longitudinal section of one of the clutches which form parts of the transmission mechanism and which constitute in themselves an embodiment of my invention.

Figure 1:
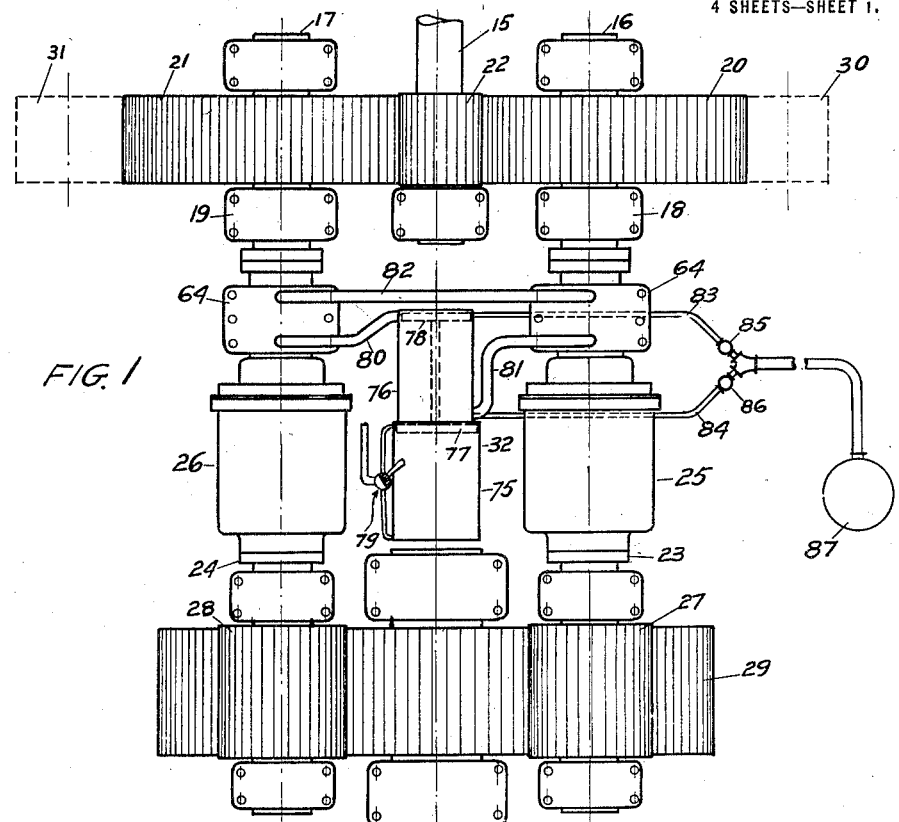
Figure 1 is a plan view of a transmission mechanism, arranged and constructed in accordance with my invention and constituting an embodiment thereof.
Figure 2:
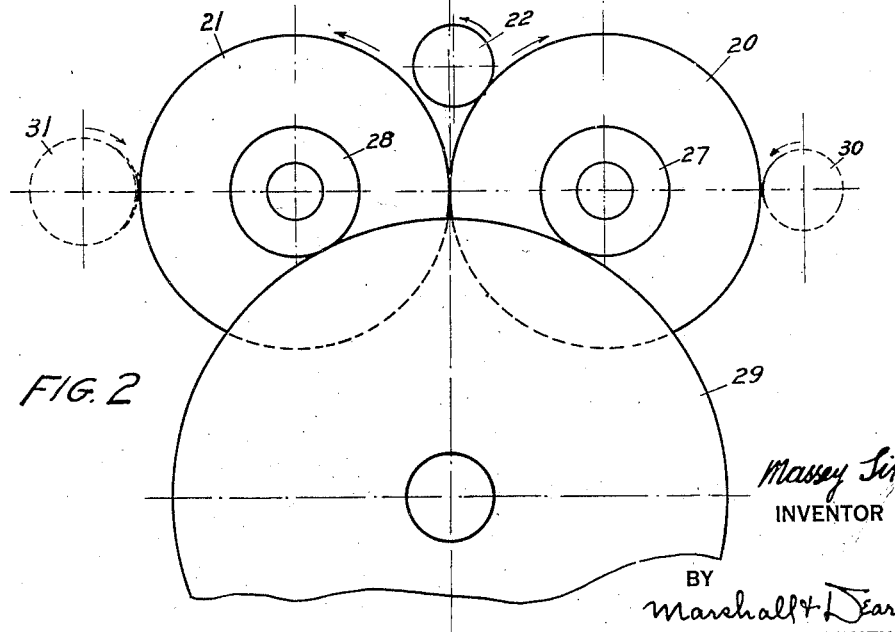
Fig. 2 is a diagrammatic end elevation of the same mechanism.

Figs. 4, 5, 6 and 7 are transverse sectional views taken respectively on the lines 4—4, 5—5, 6—6 and 7—7 of Fig. 3.

Fig. 8 is a partially sectional detail showing one of the clutch members.

Fig. 9 is a plan view of another clutch member, and

Figs. 10 and 11 are respectively a longitudinal section and an end elevation of a wedging ring which is interposed between the friction surfaces of the clutch.

Fig. 12 is a partial section corresponding to Fig. 3, of a slightly modified arrangement which also embodies my invention.

Fig. 13 is a longitudinal section of a modified clutch which also embodies my invention, and Fig. 14 is a transverse section of the same.

Fig. 15 shows one of the clutch members in detail, and Fig. 16 is a plan view of one of the clutch blocks Fig. 17 is a longitudinal section which corresponds to Fig. 3 but shows a modification of my invention in which the friction portion of the clutch is like the Fig. 13 construction.

Figs. 18 and 19 are transverse sectional elevations, taken respectively on the lines 18—18 and 19—19 of Fig. 17.

Fig. 20 is an elevation of one of the clutch members and

Fig. 21 is a plan view of one of the clutch blocks.

Special reference may first be had to Figs. 1 to 11 inclusive; the mechanism here shown comprises a driving shaft 15, a pair of gear shafts 16 and 17 which are mounted in bearings 18 and 19, and to which are secured gear wheels 20 and 21. The driving shaft 15 has a pinion 22 which meshes with the gear wheel 20, the gear wheels 20 and 21 being in mesh with each other as clearly shown in Fig. 2. A pair of clutch shafts 23 and 24 are adapted to be connected respectively to the shafts 16 and 17 by clutches 25 and 26. Mounted on the clutch shafts 23 and 24 are pinions 27 and 28 which mesh with a gear wheel 29.

The gear wheels 20 and 21 constitute the driving members of the apparatus and they may be connected to a steam turbine or other suitable driving engine or motor by a pinion 22 on the turbine shaft. The gear wheels 20 and 21 may in fact mesh with two or more pinions of varying sizes of which the pinions 30 and 31 (shown in dotted lines) are examples, to enable them to be driven by engines or motors which operate at unlike speeds. The utility of such an arrangement will be readily understood and the pinions 30 and 31 may, for example, be connected respectively to high pressure and low pressure turbines.

As more fully explained hereinafter, the clutches are preferably actuated by fluid pressure and the pump 32 constitutes a convenient means for governing the action of the fluid to control the operation of the clutches.

The clutches are of like construction and only one will be described in detail.

Referring particularly to Figs. 3 to 11 inclusive, the clutch 25 comprises a barrel 33 which is affixed to the clutch shaft 23 and has an outwardly tapered bore near its open end, a plug 35 longitudinally movable into and out of the barrel and a cylinder 36 which is secured to the shaft 16.

The interior of the barrel 33 is smaller in diameter at its inner end than at its outer end which is tapered outwardly and is provided with a pair of substantially opposite grooves forming shoulders 37 (see Fig. 5). The plug 35 is slightly smaller than the opening in the barrel 33 except for its outer tapered section which is adapted to coöperate with the tapered opening in the barrel when the clutch is set. The tapered surfaces may coöperate directly but I prefer to mount a loose ring 38, formed as shown in Figs. 10 and 11, within the tapered surface 39 of the barrel 33.

The ring has a flange 40 which overhangs the end of the plug 35 and the corresponding end of the barrel 33 has a flange ring 41 which limits the longitudinal movement of the plug relative to the barrel. Furthermore, the arrangement of parts is such that the wedge ring 38 is loosened from the surface 39 of the barrel each time the plug is moved outwardly, thereby permitting a rotative movement of the wedge ring and preventing the surfaces coming into contact in exactly the same positions each time. The total friction absorbed by the clutch is divided between the two surfaces of the wedge ring 38 and consequently each clutch surface is subject to only a portion of the wear occasioned thereby. The wedge ring may be easily removed and replaced by temporarily removing the flange ring 41.

The plug at its inner end, as shown in Figs. 3 and 4, is provided with a cylindrical projection 42 which fits into a socket 43, provided in the bottom of the barrel. The plug has a transverse slot 47 which is enlarged to form a hollow center 47ª as shown in Figs. 3 and 5. Mounted in the slot 47 are a pair of clutch jaws 48 which occupy the positions shown in Figs. 3 and 5 when the clutch is released and may be forced outwardly to coöperate with the shoulders 37 when the clutch is set. Roller or ball bearings 49 are preferably interposed between the jaws and the thrust surfaces of the plug to enable the jaws to move radially with greater facility when they are actuated as hereinafter explained.

An actuating block 50 which is attached to a piston rod 51 extends between the jaws 48 and is connected to them by toggle links 52 and suitable pins 53. The arrangement of parts is such that when the piston rod 51 is forced inwardly toward the bottom of the barrel the toggle joint formed by the links is straightened and the jaws are forced apart.

The clutch is operated by fluid pressure, the cylinder 36 being provided with an inner piston 56 to which the rod 51 is connected, and an outer ring piston 57 which is connected directly to the plug 35 by a plurality of tie rods or bolts 58 as clearly shown in Fig. 8.

The cylinder 36 has a relatively small central opening 59 in which the piston 56 operates and a counter-bored opening 60 in which the ring piston 57 operates. A head 61 is secured to the open end of the cylinder 36 and is formed to extend materially into the opening 60, the piston 56 being relatively long and extending into a cylindrical opening 62 in the cylinder head 61.

The outer end of the plug is hollow to receive the cylinder 36 on which it is slidably mounted, independent rotation being prevented by splines 63 as shown in Fig. 6.

The cylinder 36 is coupled to the gear shaft 16 and is rotatably supported by a bearing 64 which has annular grooves 65 and 66 to which fluid supply pipes are connected as hereinafter explained. The cylinder 36 has passages 67 and 68 communicating with the groove 65. The arrangement is such that when some suitable fluid under pressure, such as oil, is admitted to one of the grooves, the pistons 57 and 56 are successively actuated in one direction, and when fluid under pressure is admitted to the other groove the pistons are operated in a reverse direction.

As shown in Fig. 1, the pump 32 comprises an actuating cylinder 75, a pumping cylinder 76 and pistons 77 and 78 which are connected in tandem and operate in their respective cylinders. Steam or some other fluid under pressure is admitted to the actuating cylinder 75 on one side or the other of the piston 77, according to the position of a control lever 79. The pumping cylinder 76 is connected at one end by a pipe 80 to the groove 66 through which oil is supplied to the passages 69 and 70 of the clutch 26. It is connected at its opposite end by a pipe 81 to the corresponding groove of the clutch 25. The pipe 82 interconnects the grooves 65 of the bearings 64 of the two clutches.

The cylinder 76 is connected at its respective ends by pipes 83 and 84 in which are check valves 85 and 86, to a source of fluid supply such as a tank 87, the arrangement being such that additional fluid may always be drawn automatically through the check valves to make up for any leakage which may occur in the actuating mechanism.

The operation of the clutches is as follows:—assuming that the parts occupy the positions in which they are shown in Fig. 1, the clutch 26 being released and the clutch 25 set,—if the lever 79 is thrown to its opposite position, steam is admitted so as to move the piston 77 to the opposite end of the cylinder 75. The piston 78 is correspondingly moved in the pumping cylinder 76 and forces the oil into pipe 81 and receives oil on the other side of the piston from the pipe 80. The oil from the pipe 81 is forced through the groove 66 and through the passages 69 and 70 of the clutch 25, and successively moves the pistons 56 and 57. The positive jaws of the clutch 25 are thus released before the friction surfaces of clutch 26 are set into engagement, the succession of operation depending upon the fact that the passage 67 is larger than the passage 68 and the passage 69 smaller than the passage 70. The oil on the opposite side of these pistons is forced out through the passages 67 and 68, through the groove 65, and through the pipe 82 to groove 65 of the other clutch. From this point it is forced into the passages 67 and 68 of the clutch 26, thereby actuating first the piston 57 which carries along piston 56, but without setting the clutch jaws 48. After the friction clutch is set and the piston 57 is stopped, piston 56 moves independently and sets the clutch jaws. The succession of this operation depends upon the fact that the opening 68 is smaller than the opening 67.

The operation of the complete apparatus will be apparent from the foregoing and will now be outlined briefly as follows: Assuming that the clutch 25 is released and the clutch 26 set,—if the driving pinion 22 rotates as indicated by the arrow shown in Fig. 2, it is evident that the shafts 16 and 17 with their affixed driving clutch parts, will each rotate in a reverse direction.

By reason of the fact that the gear shafts 16 and 17 are connected by direct gears they always operate in reverse directions. Consequently, with the clutch 26 set, as assumed, the pinion 28 rotates in the same direction as the pinion 22 and gear 29 in the opposite direction.

Assuming that it its now desired to reverse the direction of rotation of the gear 29, the lever 79 is thrown from one position to the other, the pump 75 is actuated, the clutch 26 released, and the clutch 25 set. The pinion 27 rotates now in the opposite direction to that of the driving pinion 22 and gear 29 in the same direction.

It is evident that when the clutch 25 is being set the tapered friction surfaces will first be engaged and will act as a brake in bringing the driven clutch shafts 23, 24 and their attached parts, to rest, and finally, when the clutch is set, the jaws 48 will be locked against the shoulders 37 and a positive driving connection established.

As an example of a modification which also embodies my invention reference may now be had to Fig. 12. I have here shown a clutch bearing 90 which replaces the bearing 64 for example, and is provided with four annular grooves or channels 91—92—93—94. The grooves 93 and 94 are respectively connected behind the ring piston 57 and the cylinder piston 56 while the grooves 91 and 92 are respectively connected on the opposite sides of the pistons 57 and 56. In this arrangement the fluid supply pipe is branched as shown at 95, shut-off valves 96 and 97 being provided in the branches so that the clutch sections may be selectively operated and the clutch used either as a combination clutch, or a friction clutch, according to the characteristics desired.

Referring to Figs. 13, 14, 15 and 16, in which I have illustrated a modification of my invention, the clutch here shown comprises a socket member 100 which is attached in any suitable manner to a shaft section 101 and a plug member 102 which is adapted to be attached to another shaft section.

The socket member comprises a base 103 in which is a cylindrical recess 104 and a cylindrical body 105 which is secured to the base by bolts 106 and is made in two halves as clearly shown in Fig. 14. The parts are attached in any suitable manner, bolts 107 being shown as a convenient means for this purpose. The inner wall of the cylindrical body is provided with an annular recess 108 which is corrugated or waved as clearly shown in Fig. 13, forming a toothed or grooved surface 109 of relatively large area.

The plug member 102 comprises a cup-shaped frame 110 having a cylindrical projection 111 which extends into the cylindrical recess 104 and constitutes a guide bearing for the plug member of the clutch. The cylindrical walls of the cup are provided with a plurality of recesses 112 so that it has the form of a cage and is adapted to receive a plurality of friction blocks 113.

The bottom wall of each of the recesses 112 is inclined to the axis so that the blocks are forced outwardly when the plug member as a whole is moved axially into the socket member of the clutch. The outer ends of the blocks fit into the recesses 108 in the socket member so that they are held against axial movement and their inner surfaces are beveled to coöperate with the wedge surfaces of the plug member.

The sides of the recesses 112 are converged as shown in Fig. 14 and are tapered from end to end, the block being formed to coöperate with the recesses, the arrangement of parts being such that when the plug is moved toward the socket member to set the clutch the blocks are forced radially outward by the tapered bottom of the recess. On the other hand, when the plug member is moved away from the socket to release the clutch the tapered sides act to pull the blocks radially inward and thus positively release the clutch surfaces. The recesses 112 are considerably longer than the blocks so that the plug member may move axially in either direction while the blocks are prevented from such motion since they are positioned in the recesses 108 of the socket member.

In order to assemble the blocks the outer flange 114 of the cup may be removable and is shown held in place by bolts 115.

By extending the tapered side surfaces a distance of half the length of the blocks, they may be removed and thus allow the cup 110 to be made in one piece.

The bottom walls of the recesses 112 are made relatively thin and are slotted to make them to a greater or less degree resilient, thereby holding the clutch members in firm engagement independently of any slight movement of the plug member relative to the socket. This insures smoother working of the clutch.

The piston rod 116 is bolted to the cup 110 and extends axially inward from the bottom. It has an enlargement or piston 115 operating in a cylinder 117, which corresponds to the cylinder 36 of the previous figures and the piston 115 is actuated by fluid pressure admitted through passages 118 or 119. The end of the cylinder 117 is provided with a cap or head 121 through which the shaft 116 extends.

When fluid pressure is admitted through the passage 118 the piston 115 is forced to the left in Fig. 13 and the clutch is actuated, the jaws or blocks 113 being forced outward into engagement with the toothed surface 109. The clutch is released when fluid pressure is admitted at the opposite end of the cylinder through passage 119.

The friction clutch arrangement of Figs. 13 to 16 inclusive may be combined with the jaw clutch members as in Figs. 3 to 6. This combination is illustrated in Figs. 17 to 21 inclusive in which the parts are designated to correspond to their designation in the Fig. 3 and Fig. 13 constructions.

The socket member which is designated 100ª corresponds in part to the socket member 103 of Fig. 13 and in part to barrel 33 of Fig. 3. The plug member 102ª in like manner corresponds in part to the plug member 102 of Fig. 13 and to the plug member 35 of Fig. 3. The socket member comprises a base 103ª which takes the place of the base 103, being elongated and formed integral with the barrel 33. 110ª designates the cup-shaped frame and corresponds to the frame 110 of Fig. 13, but is enlarged to include the plug member as clearly shown in Fig. 17. In operation, the friction porton of the clutch operates as already described in connection with the Fig. 13 construction and the clutch as a whole operates as described in connection with the Fig. 3 construction.

It is evident that the structures illustrated and described may be modified in various particulars within the spirit and scope of my invention, and I intend that only such limitations be imposed as are indicated in the appended claims.

What I claim is:

1. A clutch comprising a barrel constituting one of the clutch members and having longitudinal ribs or shoulders and a tapering friction surface, a coöperating clutch member extending into the barrel and having positive clutch jaws and a friction surface adapted to coöperate with the friction surface of the barrel, and fluid actuated means for forcing the coöperating member into the barrel to set the friction surfaces, and means for actuating the jaws after the friction surfaces are in engagement.

2. A clutch comprising a barrel having a substantially cylindrical bore section and a tapering bore section, longitudinal grooves in the cylindrical section forming clutch shoulders, a coöperating clutch member comprising a cylindrical section having a transverse slot, radial clutch jaws in said slot, and a taper section adapted to coöperate with the taper bore section of the barrel, and means for forcing one member of the clutch into the other to set the taper friction surfaces, and independent fluid actuated means for forcing the clutch jaws radially outward to engage the longitudinal shoulders.

3. A clutch comprising positive locking jaws, friction clutch members, and means comprising separate fluid pressure actuated pistons for setting the clutch by first moving the coöperating friction members into engagement and then setting the positive locking jaws.

4. A clutch comprising positive locking jaws, friction clutch members, a pair of independent fluid pressure actuated pistons for said jaws and members, and means for causing the pistons to act in succession for setting the clutch by first moving the coöperating friction members into engagement and then setting the positive locking jaws.

5. A clutch comprising positive locking jaws, an actuating piston for setting the jaws, friction clutch members, a ring piston for actuating the friction clutch members slidably mounted on the actuating piston for the locking jaws, a cylinder in which the first-named piston operates, and an annular space, constituting a fluid chamber independent of the cylinder, in which the ring piston operates and means for admitting actuating fluid to the cylinder and to the annular space.

6. A clutch comprising positive locking jaws, an actuating piston for setting the jaws, friction clutch members, a ring piston for actuating the friction clutch members slidably mounted on the actuating piston for the locking jaws, a cylinder in which the first-named piston operates, and an annular space, constituting a fluid chamber independent of the cylinder, in which the ring piston operates; and fluid pressure passages for admitting actuating fluid to the cylinder and to the annular space respectively.

7. A clutch comprising positive locking jaws, friction clutch members, and fluid pressure actuated pistons for either actuating the clutch parts in succession or selectively actuating them as desired.

8. A clutch comprising positive locking jaws, friction clutch members, means comprising separate fluid pressure actuated pistons for setting the clutch by first moving the coöperating friction members into engagement and then setting the positive locking jaws, and means for permitting the independent setting of the clutch parts.

9. A clutch comprising positive locking jaws, friction clutch members, a pair of actuating pistons for the jaws, and the members arranged to be moved by fluid pressure, means for independently actuating the pistons, and means for causing the pistons to act in succession for setting the clutch.

10. A clutch comprising positive locking jaws, friction clutch members, a pair of actuating pistons for the jaws and the members arranged to be moved by fluid pressure, means for independently actuating the pistons, and means for causing the pistons to act in succession for setting the clutch by first moving the coöperating friction members into engagement and then setting the positive locking jaws.

11. A clutch comprising positive locking jaws, an actuating piston for setting the jaws, friction clutch members, a ring piston for actuating the friction clutch members, slidably mounted on the actuating piston for the locking jaws pressure containing cylinders in which said pistons are movably mounted, and means for either actuating the pistons independently or successively as desired.

12. A clutch comprising positive locking jaws, an actuating piston for setting the jaws, friction clutch members, a ring piston for actuating the friction clutch members slidably mounted on the actuating piston for the locking jaws, a cylinder in which the first-named piston operates, an annular space, constituting a fluid chamber independent of the cylinder in which the ring piston operates, fluid pressure passages for admitting actuating fluid to the cylinder and to the annular space respectively, and means for causing the pistons to be actuated in a predetermined sequence.

In witness whereof, I have hereunto set my hand this 2d day of November, 1917.

MASSEY SITNEY.